June 25, 1968 C. E. JACOBY 3,389,662
LOW PROFILE CONVEYOR
Original Filed Oct. 23, 1964 6 Sheets-Sheet 1

INVENTOR
CHARLES E. JACOBY
BY Seidel & Gonda
ATTORNEYS.

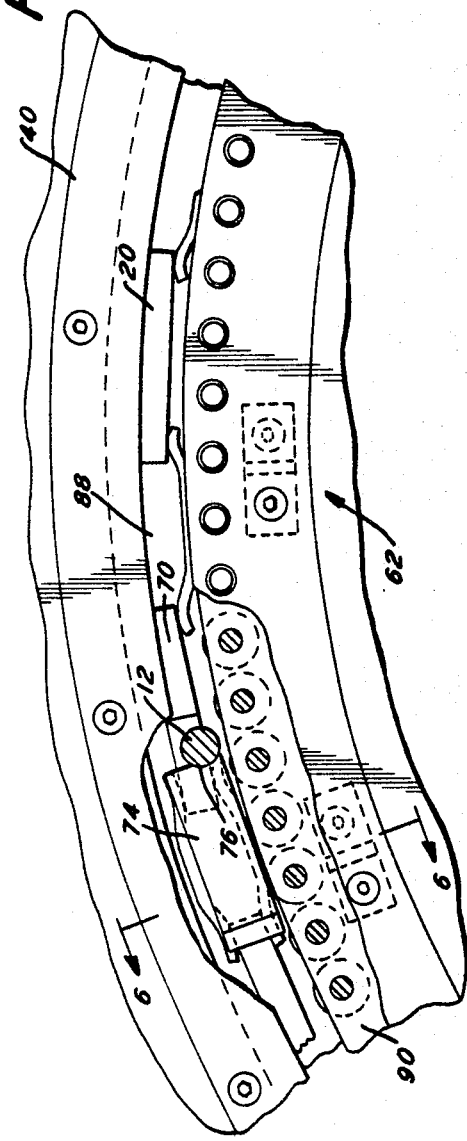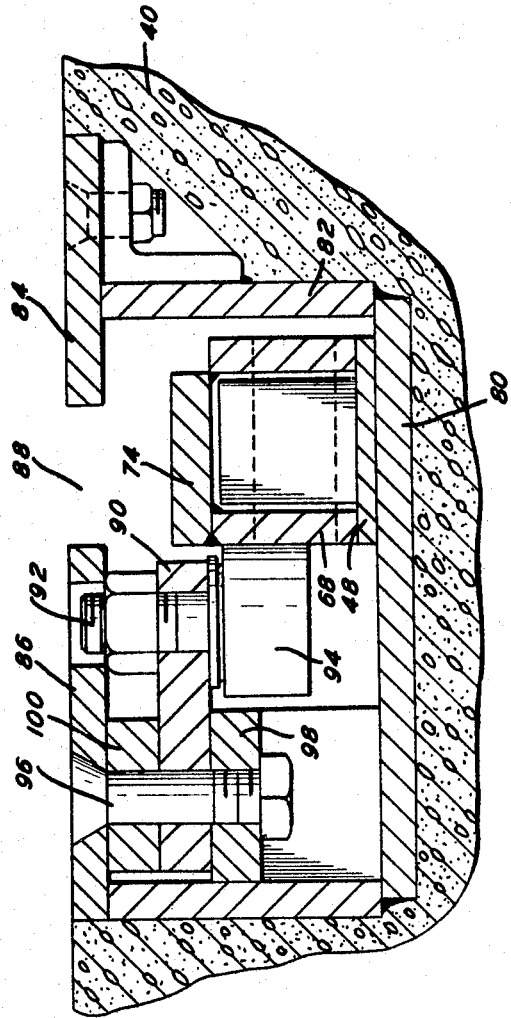

June 25, 1968

C. E. JACOBY 3,389,662

LOW PROFILE CONVEYOR

Original Filed Oct. 23, 1964

INVENTOR
CHARLES E. JACOBY

BY Seidel & Gonda

ATTORNEYS.

June 25, 1968  C. E. JACOBY  3,389,662
LOW PROFILE CONVEYOR
Original Filed Oct. 23, 1964  6 Sheets-Sheet 4
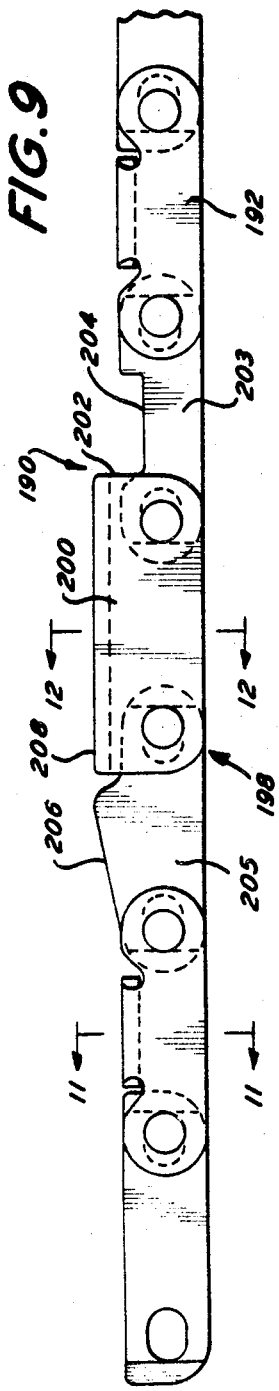
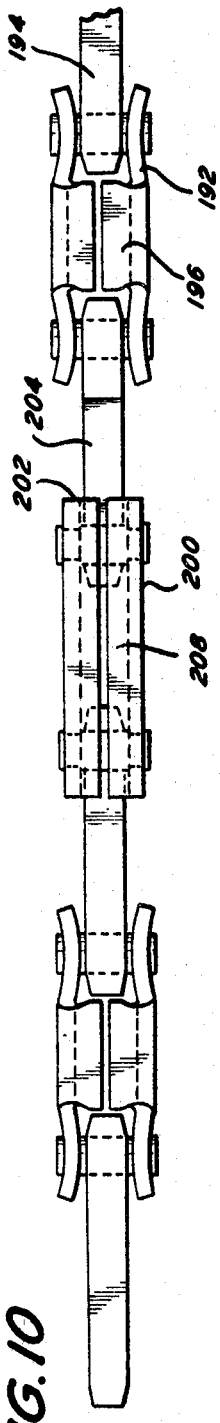
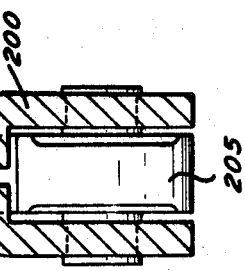
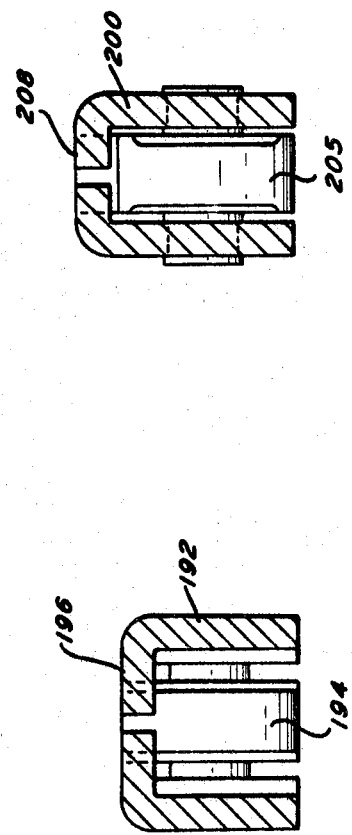
INVENTOR
CHARLES E. JACOBY
BY Seidel & Gonda
ATTORNEYS.

June 25, 1968  C. E. JACOBY  3,389,662
LOW PROFILE CONVEYOR

Original Filed Oct. 23, 1964  6 Sheets-Sheet 5

INVENTOR
CHARLES E. JACOBY

BY Seidel & Gonda

ATTORNEYS.

June 25, 1968   C. E. JACOBY   3,389,662
LOW PROFILE CONVEYOR
Original Filed Oct. 23, 1964   6 Sheets-Sheet 6
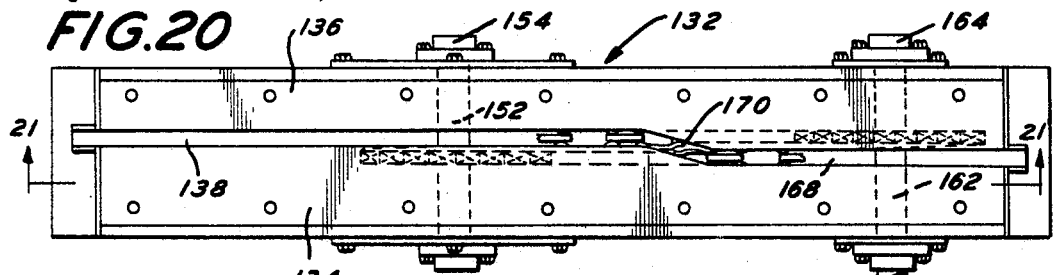
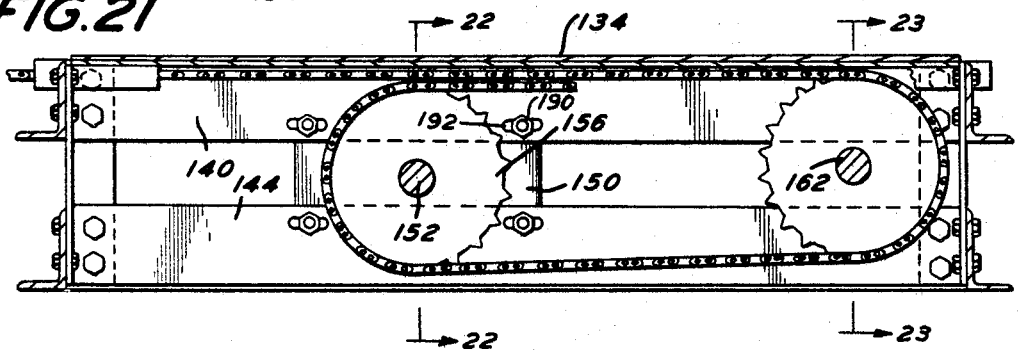
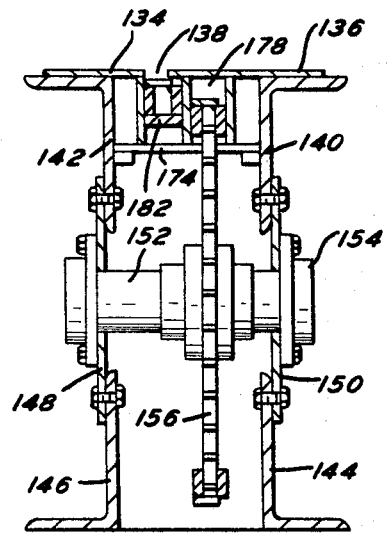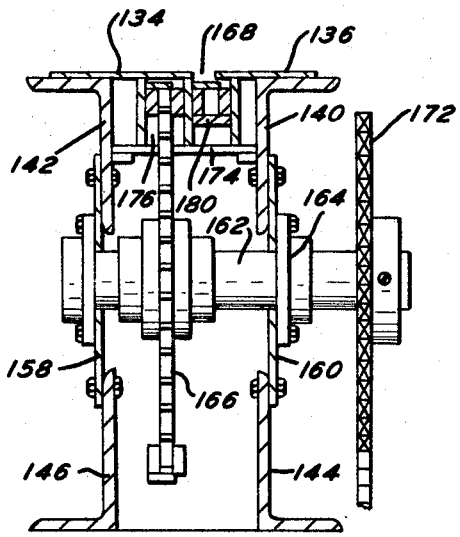
INVENTOR
CHARLES E. JACOBY
BY Seidel & Gonda
ATTORNEYS.

United States Patent Office

3,389,662
Patented June 25, 1968

1

3,389,662
LOW PROFILE CONVEYOR
Charles E. Jacoby, Bethlehem, Pa., assignor to SI Handling Systems, Inc., Easton, Pa., a corporation
Continuation of application Ser. No. 405,951, Oct. 23, 1964. This application May 31, 1967, Ser. No. 642,609
16 Claims. (Cl. 104—172)

ABSTRACT OF THE DISCLOSURE

A conveyor chain is constructed for pushing the tow pin on a vehicle to cause the vehicle to move along a guided path. The conveyor includes dog sections at spaced points therealong with each dog section being an integral link of the chain recessed with a notch at its upper surface so as to provide a pushing surface. Other links of the chain are provided with a blocking surface at the top thereof so as to prevent pushing contact with the chain.

---

This application is a continuation of Ser. No. 405,951, filed Oct. 23, 1964.

This invention relates to a slide chain conveyor system adapted to engage and pull a tow pin on a material handling truck.

Material handling trucks are generally moved by automatic conveying systems mounted beneath the supporting surface on which the truck rolls. The truck is provided with a vertically reciprocable tow pin adapted to be engaged by a dog on the conveyor. The dog engages the tow pin and pulls the truck to a desired location. At this location, the dog automatically releases the tow pin and truck.

This invention has as one of its objects the provision of an improved slide chain conveyor for engaging a vertically reciprocable tow pin on a material handling truck.

A further object of this invention resides in the provision of a slide chain conveyor which has a low profile, thereby enabling it to be mounted beneath any floor in a conventional building.

Yet another object of this invention resides in an improved slide chain conveying system for engaging a tow pin on a material handling truck wherein conveyor line surge is reduced as the conveyor engages the tow pin.

A still further object of this invention is to provide an improved dog section on the conveyor which positively engages a tow pin at greater conveyor speeds than heretofore achieved.

Another object of this invention is to provide a tow pin conveying system which includes arcuate turns having a smaller radius than heretofore achieved.

Another object of this invention is to provide a tow pin conveying system which is self-cleaning.

A further object of this invention is to provide an improved drive arrangement for the slide chain conveyor of the present invention.

A still further object of this invention is to provide a tow pin conveying system which can be constructed at approximately half the cost of existing systems and which can be economically installed in any existing floor structure.

Other objects will appear from the disclosure which follows hereinafter.

For the purpose of illustrating the invention, there are shown in the drawings forms which are presently preferred; it being understood, however, that this invention is not limited to the precise arrangements and instrumentalities shown.

FIGURE 1 is a fragmentary top plan view of a first embodiment of a tow pin conveying system of the instant invention with a portion of the truck supporting surface broken away for purposes of illustration.

FIGURE 2 is a cross-sectional view taken substantially along the plane indicated by the line 2—2 of FIGURE 1.

FIGURE 3 is a cross-sectional view taken substantially along the plane indicated by the line 3—3 of FIGURE 2.

FIGURE 4 is a cross-sectional view taken substantially along the plane indicated by the line 4—4 of FIGURE 1 and illustrating one embodiment of the conveyor support structure at turns.

FIGURE 5 is a fragmentary top plan view of a second embodiment of a tow pin conveying system within the present invention with a portion of the truck supporting surface broken away for purposes of illustration.

FIGURE 6 is a cross-sectional view taken substantially along the plane indicated by the line 6—6 of FIGURE 5 and illustrating another embodiment of the conveyor support at turns.

FIGURE 9 is a fragmentary side view in elevation of another embodiment of a conveyor chain which can be used with either of the two pin conveying systems illustrated in FIGURES 1 and 5.

FIGURE 10 is a fragmentary top plan view of the conveyor chain shown in FIGURE 9.

FIGURE 11 is a cross-sectional view taken substantially along the plane indicated by the line 11—11 of FIGURE 9.

FIGURE 12 is a cross-sectional view taken substantially along the plane indicated by the line 12—12 of FIGURE 10.

FIGURE 20 is a top plan view of the power section of the tow pin conveying system illustrated in either FIGURE 1 or FIGURE 5 for transmitting movement to the conveyor chain.

FIGURE 21 is a cross sectional view taken substantially along the plane indicated by the line 21—21 of FIGURE 20.

FIGURE 22 is a cross-sectional view taken substantially along the plane indicated by the line 22—22 of FIGURE 21.

FIGURE 23 is a cross-sectional view taken substantially along the plane indicated by the line 23—23 of FIGURE 21.

Figure 7:
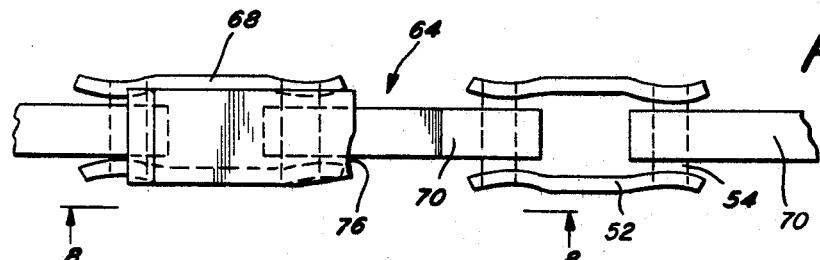
FIGURE 7 is a fragmentary top plan view of the conveyor shown in FIGURE 5.

Referring now to the drawings in detail, and in particular FIGURES 1–4, a first embodiment of the tow pin conveying system comprising the subject matter of the present invention is generally designated by the numeral 10.

The system 10 comprises a slide chain conveyor 13 adapted to engage a vertically reciprocable tow pin 12 on a material handling truck supported in rolling engagement with a concrete floor 40.

The conveying system 10 is embedded in the floor 40. If desired, the conveying system 10 could be supported on the floor. The system 10 includes a generally channel-shaped track 42 having laterally extending flanges 43 embedded in the floor 40 below its top surface. Secured to the legs of the track 42 by welding or the like are a pair of flanges 44 embedded within the floor 40 flush with its top surface. The flanges 44 are spaced from each other so as to define an elongated slot 56. The tow pin 12 of the material handling truck is adapted to ride within the slot 56 as shown in FIGURE 2. Braces 46 extend between the flanges 44 and flanges 43 and reinforce the track structure.

Residing on the flat bight portion of the track 42 is a steel wear plate 48. The conveyor 13 comprises a plurality of links in sliding frictional engagement with the wear plate 48. Because of the sliding friction between the conveyor and the wear plate, line surge of the conveyor upon engaging the tow pin 12 is reduced. It has been found that in conventional drag line conveyors which are mounted upon rollers, a play of approximately 6 inches exists. As the conveyor links will roll over the rollers mounted upon the track the links will have a tendency to momentarily pause in their travel as a dog on the conveyor makes contact with the tow pin 12. As the slack in the chain is taken up, the conveyor will surge forward. This surge often results in breakage of the engaging face of the dog. By providing a wear plate and a conveyor in sliding frictional engagement with the wear plate, the tendency of the conveyor to surge is materially reduced. The sliding friction acts as a brake on the links of the chain and prevents any appreciable slack in the chain.

For the most part, the conveyor 13 is of metal construction and can be purchased on the open market. The conveyor 13 comprises a series of block links 58 formed with an elliptical slot 60 at both of its ends. A pin or rivet 54 is disposed within each slot 60 in the block links. A pair of metal side bars 52 mounted on opposite ends of the pin 54 connect a block link to a succeeding and preceding block link to form the chain 13. The block links and side bars include induction-hardened sliding surfaces offering superior resistance to abrasive and corrosive wear. A chain conveyor of this nature is manufactured by the Chain Belt Co. of Milwaukee, Wis. and sold under the trade name of "Rex 3500."

A portion of the chain conveyor 13 is modified as shown in FIGURE 2 to form a dog section generally designated by the numeral 14 for engaging the tow pin 12 of a material handling truck. The dog section 14 of the conveyor 13 includes a block link 16 having an inclined camming surface 18 along its upper edge. A horizontal portion 19 is connected to the camming surfaces 18 on the block link 16. The spaced side bars 20 immediately following the block link 16 include a horizontal, tow pin dwell surface 22. A block link 24 connects the side bars 20 in spaced relation to a pair of spaced side bars 26. The side bars 26 include a pushing face 28 for engaging and pushing the tow pin 12.

As the dog section 14 on the chain conveyor moves along the wear plate 48 adjacent the tow pin 12, the camming surfaces 18 will initially contact the tow pin 12 and raise it. The raised tow pin will then ride along the dwell surfaces 19 and 22. When the conveyor 13 moves to a position wherein the tow pin 12 is between the side bar pairs 20 and 26, the vertically reciprocable tow pin 12 will drop between these links. Subsequent movement of the chain 13 will cause the pushing face 28 of the side bars 26 to engage the tow pin 12 and move it, thus conveying the material handling truck. If the space between side bar pairs 20 and 26 is not large enough for allowing the tow pin 12 to drop therebetween, the pushing face on the side bars 26 can be elevated above the dwell surface 22 on the side bars 20. In this manner, the tow pin 12 will also be engaged by the pushing face 28.

By use of the dwell surface 22 on the side bars 20, the tow pin 12 is prevented from jumping over the pushing face 28 on the side bars 26. Thus, if the chain is moving at high speed to the right as shown in FIGURE 2, there will be a tendency for the cammed tow pin to ski jump over the side bars 26. The dwell surface 22 stabilizes the elevation of the tow pin so that a greater conveying speed can be maintained.

If the truck happens to be moving faster than the conveyor 13, when the tow pin 12 is initially disposed within the slot 56, means are provided on the dog section 14 to insure engagement with the tow pin. Hence, a block link 32 is provided which comprises the mirror image of the block link 16. The block link 32 includes an inclined camming surface 34. The side bars 26 are provided with inclined camming surface 30 and a horizontal dwell surface 31.

As the tow pin 12 passes over the dog section 14, the tow pin will engage the camming surfaces 34 and 30 and be raised. The horizontal dwell surface 31 will tend to stabilize the raising of the tow pin 12. The tow pin 12 can drop into the space between the side bars 26 and 20 or rest on dwell surface 22 and be engaged by pushing surface 28 on the block link 26.

If desired, a roller 38 may be mounted within an aperture 36 in the floor 40 beneath the chain 13 at spaced intervals. The roller 38 is adapted to extend through an aperture 39 in the wear plate 48 into rolling engagement with block links and side bars of the chain 13. These rollers can be spaced at three foot intervals and will reduce some of the sliding friction of the block links and side bars on the wear plate. This will provide easier flow of the chain along the wear plate.

As clearly illustrated in FIGURES 1 and 4, the chain 13 and track 42 have arcuate turns. Heretofore, a minimum radius of 4 feet was required in order to effect a turn of a drag line chain. This was primarily due to the incapacity of the links of the chain to cock relative to each other. However, with a chain as disclosed above, a turning radius of approximately 20 inches can be achieved. Due to the elliptical slots 60 connecting the side bars and the block links, the block links can rotate in the horizontal plane of the chain relative to the side bars. This greatly reduces the turning radius needed.

In order to effect a smooth transition of the chain 13 around curves in the track 42, a plurality of rollers 50 are mounted upon the flange 43 of the track 42, as shown in FIGURE 1. The rollers 50 extend through a slot 51 in the innermost leg of the channel-shaped track 42 for engagement with the side bars in chain 13.

The conveying system 10 is also self-cleaning. Heretofore, in conventional conveying systems, dirt particles would fall through the slot 46 and accumulate along the track 42. In the present invention, dirt particles which accumulate along the wear plate 48 will be dragged by the sliding surfaces of the side bars and block links along the wear plate. Spaced pits at approximately every ten feet may be disposed in the floor 40 beneath the track 42. The dirt particles dragged by the chain 13 will fall by gravity and accumulate in these pits.

The links in the chain conveyor 13 are only approximately 2 inches high. Therefore conventional floors and ceiling structures, which are approximately 8 inches in depth can easily be fitted with the chain.

FIGURES 5 to 8 illustrates a second embodiment of the tow pin conveying system within the scope of the present invention and is generally designated by the numeral 62.

The conveyor system 62 includes a slide chain conveyor 64. The conveyor 64 is identical to the conveyor 13 except for its dog section 66.

The dog section 66 includes a pair of spaced side bars 68 pivotably connected to a block link 70. The portion of the block link 70 adjacent the side bars 68 includes a recess 72. A pusher plate 74 is welded or otherwise secured to the side bars 68 adjacent the recess 72 and the block link 70. The pusher plate 74 includes an off-center arcuate pushing surface 76 for engaging a tow pin. The pusher plate 74 also includes an inclined camming surface 78 on its end remote from the pushing surface 76.

Figure 8:
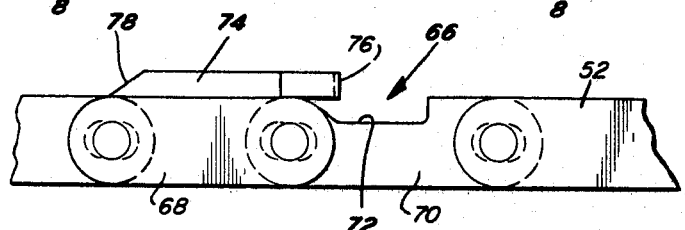
FIGURE 8 is a side view in elevation of the conveyor shown in FIGURE 7 as seen along the plane indicated by the line 8—8 of FIGURE 7.

The links of the conveyor chain 64 in front of the block link 70 may be formed with camming and dwell surfaces similar to that incorporated in the dog section 14. This is illustrated in FIGURES 7 and 8. On the other hand, the inclined camming surface 18 and dwell surface 22 may be absent from the construction.

As the conveyor chain 64 moves along a wear plate 48 disposed within the floor 40, a tow pin will drop into the slot 72 in the block link 70 and be engaged by the arcuate pushing surface 76 on the pusher plate 74. The recess in the block link 70 allows the chain 64 to articulate in a vertical direction and still retain the tow pin. The tow pin slot in floor 40 is offset with respect to the longitudinal axis of conveyor 64, but along the longitudinal axis of pushing surface 76. Hence, the tow pin is precluded from dropping between the side bars 68.

If the tow truck happens to be moving faster than the conveyor chain 64, it will initially contact the camming surface 78 on the pusher plate 74. This surface will raise the tow pin as the tow truck moves past it. The tow pin will then ride on top of the pusher plate 74 and finally drop within the recess 72 in the block link 70. When the speed of the chain conveyor 64 overtakes the tow truck, the arcuate pushing surface 76 will engage the tow pin to push it.

FIGURE 6 illustrates an arrangement for effecting a smooth transition of the chain 64 around curves. The arrangement includes a track 80 embedded within the concrete floor 40. Upright side walls are connected to the track 80. Top plates 84 and 86 are connected to the side walls 82 and are spaced from each other to define a slot 88 for the tow pin of the tow truck. An intermediate roller plate 90 is secured to the top plate 86. The roller plate 90 is seated on the top of a T-shaped plate 98 and spaced from the top plate 86 by means of a spacer 100.

A pair of countersunk bolts 96 keep the top plate 86, spacer 100, roller plate 90, and T-shaped plate 98 in assembled relationship. The roller plate 90 has a plurality of roller mounting shafts 92 extending therethrough. Rotatably mounted and suspended from each shaft 92 is a roller 94 adapted to contact the side bars of the chain 64 as it traverses a curve. The rollers are hard-faced cam followers mounted upon needle bearings. The construction provides excellent support for vertical loads which can be applied on the top plate. The roller plate can easily be removed for maintenance. The rollers are spaced so as to provide at least one point contact on each side bar as it progresses around the turn.

Although the arrangement depicted in FIGURE 6 has been specifically illustrated in conjunction with the conveyor chain 64, it will be understood that this arrangement is equally adaptable for use with the conveyor chain 13. In the same manner, the arrangement illustrated in FIGURE 4 is equally adaptable for use with the conveyor chain 64.

In lieu of chain conveyor 13 or 64, the chain conveyor 190, illustrated in FIGURES 9–12, may be used in either conveyor system 10 or 62.

The chain conveyor 190 is constructed so as to preclude any possibility of a tow pin dropping between the side bars of the chain before it is engaged by a dog section. Thus, manufacturing methods in fabricating a drag-line chain conveyor may be altered. The spacing of the side bars of the chain as well as the exact position of securement of a block link between the side bars is no longer critical.

The chain conveyor 190 is substantially identical to the chain 64, except for the side bars 192. Accordingly, the conveyor 190 includes a series of spaced side bars 192 pivotably connected by block links 194. Each side bar 192 includes a laterally bent flange 196. The flanges 196 of a pair of opposed side bars 192 extend laterally from the central portion of its respective side bar towards the longitudinal axis of the chain conveyor. The space between the side bars is thus closed, thereby precluding the possibility of a tow pin dropping between the side bars before it is engaged by the dog section 198 of the chain conveyor 190.

The dog section 198 of chain 190 performs substantially the same as the dog section 66 of conveyor 64. The dog section 198 includes a pair of spaced side bars 200 having laterally bent flanges 208. The flanges 208 extend substantially the full length of the side bars 200. The side bars 200 are pivotably connected at their forward end to a block link 203 and at their rear end to a block link 205.

The portion of the block link 203 adjacent side bars 200 includes a recess 204. The side bars 200 include a pushing surface 202 projecting above one end of the recess 204.

The block link 205 includes an inclined camming surface 206.

As the conveyor chain 190 moves along the track in either conveying system illustrated in FIGURE 1 or 5, a tow pin will drop into recess 204 in the block link 203. The pushing surface 202 on side bars 200 will engage the tow pin to move it along the tow pin slot.

If the tow truck happens to be moving faster than the conveyor chair 190, it will initially contact the camming surface 206 on block link 205. This surface will raise the tow pin as the tow truck moves past it. The tow pin will ride on the flanges 208 and its vertical elevation will be stabilized. The tow pin finally drops into the recess 204 in block link 203, wherein pushing surface 202 will engage it to push the tow pin along the tow pin slot.

Figure 13:
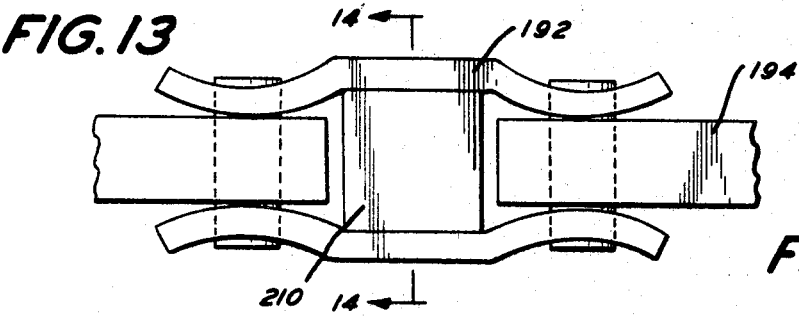
FIGURE 13 is a fragmentary top plan view of an alternative embodiment of a section of the conveyor chain illustrated in FIGURE 9.
Figures 14, 15, 16:
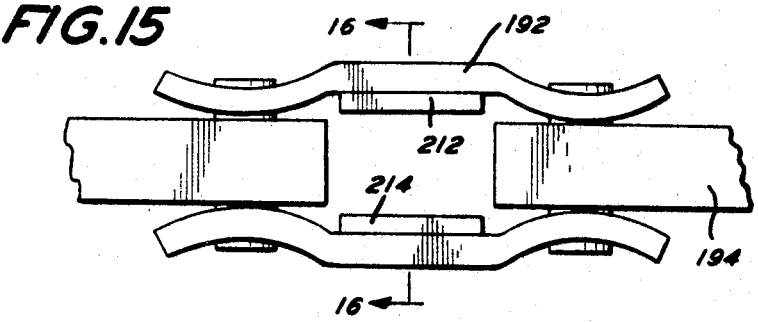
FIGURE 14 is a cross-sectional view taken substantially along the plane indicated by the line 14—14 of FIGURE 13.
FIGURE 15 is a fragmentary top plan view of still another alternative embodiment of a section of the conveyor chain illustrated in FIGURE 9.
FIGURE 16 is a cross-sectional view taken substantially along the plane indicated by the line 16—16 of FIGURE 15.

Instead of forming laterally bent flanges on the side bars 192, a flat plate 210 (FIGURE 13) or a pair of parallel bars 212 and 214 (FIGURE 15) can be welded between the side bars to close the space therebetween.

Although the flanges 196, flat plate 210, and parallel bars 212 and 214 have been illustrated in conjunction with conveyor chain 190, it should be understood that any of these modes for closing the space between the side bars may be applied to conveyor chains 13 and 64 with equal facility.

Figure 17:
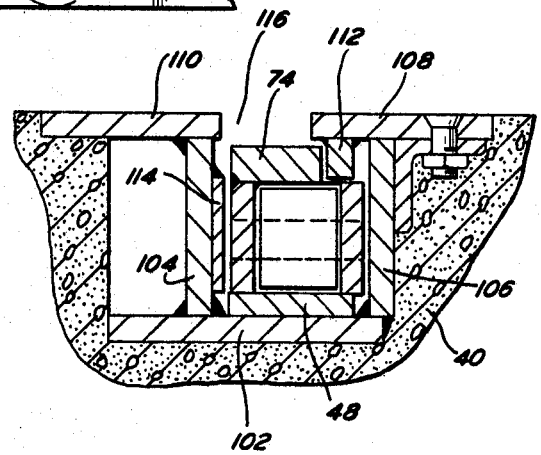
FIGURE 17 is a view similar to FIGURES 4 and 6, but illustrating another embodiment of the conveyor support structure at turns.

FIGURE 17 illustrates still another arrangement for effecting a smooth transition of the chain 13 or 64 around a curve. In this embodiment, a track 102 is embedded within the concrete floor 40. A pair of side walls 104 and 106 are secured to the track 102. Top plates 108 and 110 are secured to the side plates 104 and 106 in such a manner as to define a slot 116 for a tow pin. The usual wear plate 48 is disposed upon the track 102. Mounted upon the side wall 104 is a second wear plate 114. Depending from the top plate 108 is a hold down bar 112.

The wear plate 114 is used in lieu of rollers such as 94 and 50. The wear plate 114 will prevent the chain conveyor from twisting when subjected to high loads and high speeds rounding curves. The frictional force on the side bars will tend to maintain the length of the chain along the track by increasing frictional resistance on the chain. The hold down bar 112 will maintain the chain on the track and wear plate 48 when the chain rounds vertical curves, such as slopes in the floor 40.

It will also be apparent that the arrangement depicted in FIGURE 17 can be used as a channel track for the chain 64. If used as a straight track section, the wear plate 114 and hold down bar 112 will be removed.

Figure 18:
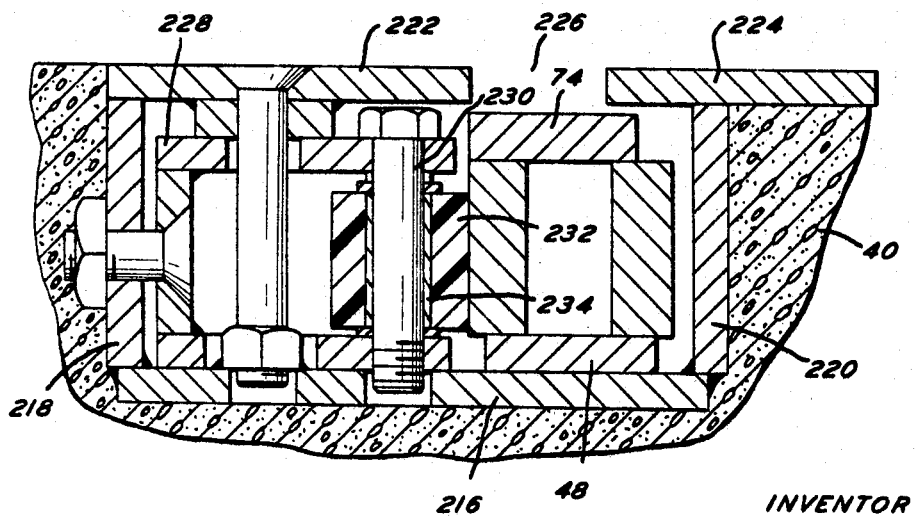
FIGURE 18 is a view similar to FIGURES 4, 6 and 9, but illustrating still another embodiment of the conveyor support structure at turns.

FIGURE 18 also illustrates another arrangement for effecting a smooth transition of the chain 13 or 64 around a curve. In this embodiment, a track 216 is embedded with the concrete floor 40. A pair of side walls 218 and 220 are secured to the track 216. Top plates 222 and 224 are secured to the side walls in such a manner as to define a slot 226 for a tow pin. The usual wear plate 48 is disposed upon track 42.

A channel member 228 is mounted between top plate 222 and track 216 to one side of the tow pin slot 226. The channel member opens in a direction facing the conveyor chain on wear plate 48. Rotatably mounted on bolts 230 extending between the channel legs are a plurality of polyurethane rollers 232. The rollers 232 are adapted to contact the chain as it rounds a curve in the conveyor system.

The polyurethane rollers 232 insure the quiet transition of the chain around the curve. Each roller is spaced from its mounting bolt 230 by an oilless bronze bushing 234. The bushings 234 provide for minimum maintenance of the device.

Figure 19:
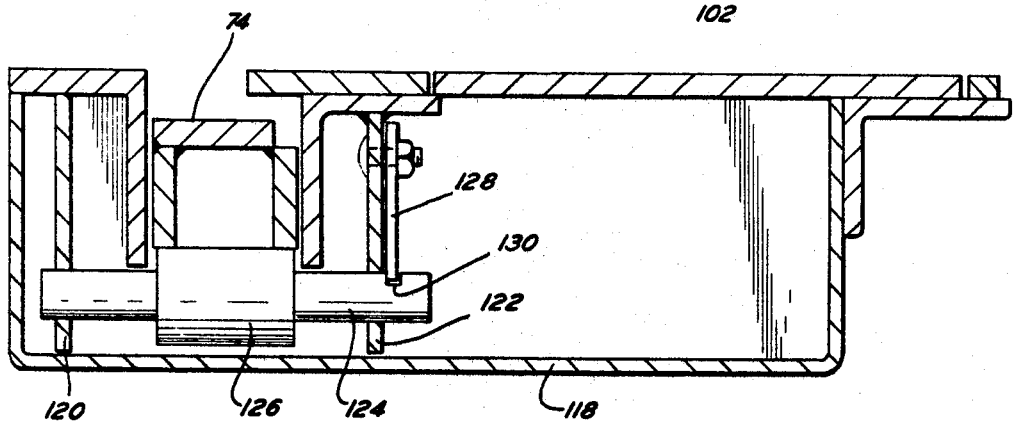
FIGURE 19 is a cross-sectional view of clean-out box arrangement for removing debris accumulated on the conveyor track.

As the conveyor system 10, the conveying system 62 is self cleaning. FIGURE 19 illustrates a receptacle for receiving dirt particles which accumulate along the wear plate 48 and are dragged by the sliding surfaces of either chains 13 or 64. The receptacle 118 will replace a section of the track of either conveying system.

Mounted within the receptacle 118 adjacent its down stream end, are a pair of bearing plates 120 and 122. Rotatably mounted between the bearing plates 120 and 122, is a roller shaft 124. The roller shaft 124 mounts a thin walled, oilless bronze bushing within a polyurethane sleeve. A keeper plate 128 is mounted upon the bearing plate 122 and is received within a peripheral notch 130 on the shaft 124. Therefore, in order to remove the roller for repair or replacement, the keeper 128 is pivoted out of seated engagement with the notch 130. The shaft 124 may then be slid from the bearing plates and the roller 126.

The receptacle 118 has a dirt accumulation area between the end of the wear plate and the track of the system and the roller 126. Dirt particles will be dragged by the conveyor chain off the wear plate and into the receptacle 118 between the end of the wear plate and the roller 126. The roller 126 also cleans the bottom of the conveyor chain as its links pass by it.

FIGURES 20 to 23 illustrate a track section housing a drive arrangement for either of the two conveying systems described.

The drive section of either conveying system is generally designated by the numeral 132. The drive section 132 includes a pair of track top plates 134 and 136 embedded within the concrete floor 40. On the upstream side of the drive section 132, the top plates 134 and 136 are spaced from each other to define a tow pin slot 138. On the downstream side of the drive section 132, the top plates 134 and 136 are spaced from each other to define a tow pin slot 168 parallel to but offset laterally from the slot 138. The slots 168 and 138 are connected by means of a jog portion 170.

An angle iron support member 140 is secured to the bottom surface of the top plate 136. Similarly, an angle iron support member 142 is secured to the bottom surface of the top plate 134. Angle iron support members 144 and 146 are adapted to be embedded in the concrete floor below the angle irons 140 and 142 respectively. A bearing plate member 148 is connected between the angle iron supports 142 and 146 on the upstream portion of the drive section 132. A bearing plate 150 is disposed parallel to the bearing plate 148 and is connected between the angle iron supports 140 and 144. A shaft 152 extends through the bearing plates 148 and 150 and is rotatably mounted within bearings 154. A sprocket 156 is keyed to the shaft 152.

A bearing plate 158 is connected between the angle iron supports 142 and 146 on the downstream end of the drive section 132. A bearing plate 160 is connected to the angle iron supports 140 and 144 parallel to the bearing plate 158. A shaft 162 extends through the bearing plates 158 and 160 and is rotatably supported within bearings 164. Keyed to the shaft 162 is a sprocket 166. Also keyed to the outer portion of the shaft 162 is another sprocket about which is entrained an endless chain 172. The drive chain 172 is adapted to be connected to a suitable electric motor.

A support plate 174 extends between the angle iron support members 140 and 142. A pair of juxtaposed channels 176 and 178 are formed between the support plate 174 and the top plates 134 and 136. A wear plate 182 is placed within the channel 176 on the upstream side of the drive section 132. A wear plate 180 is placed within the channel 178 on the downstream side of the track section 132. The sprocket 156 is adapted to extend through the support plate 174 into the channel 178 between the side bars of the conveyor chain. The sprocket 166 is adapted to extend through the support plate 174 and into the channel 176. The sprocket 166 is disposed between the side bars of the conveyor chain.

As shown best in FIGURES 20 and 21, the conveyor chain is initially disposed beneath the tow pin slot 138 within the channel 176 and on the wear plate 182. The chain is then first entrained about the sprocket 166 at the downstream end of the drive section 132. The lower run of the chain thus formed is entrained about the sprocket 156 and then disposed within the channel 178 on the wear plate 180. The chain then continues its travel onto the next track section in the system.

By doubling the chain back upon itself, as just described, the chain is maintained under tension at all times. Slack is taken up in the chain by the offset arrangement of the sprockets. However, if greater tension or more slack is desired, the plates 148 and 150 can be moved to adjust the distance of sprocket 156 with respect to sprocket 166. This is accomplished by loosening bolts 190 which mount plates 148 and 150 to the angle irons, and sliding the plates and bolts 190 in elongated slots 192 in the angle irons.

The chain 172 will drive the sprocket 166 which will impart motion to the conveyor chain of the invention. The chain will transmit motion to the sprocket 156.

The tow pin on the tow truck is initially disposed within the slot 138 and carried by the dog section on the chain. As the dog section passes the jog portion 170, the tow pin will be dropped. The tow pin has enough momentum to pass through the jog portion 170 and into the slot 168. As the dog section on the chain enters the channel 178 beneath the slot 168, it will reengage the tow pin and convey the truck.

The conveying system 10 or 62 can be economically installed in any existing floor of a building because of its low profile. If desired, the chain 13 or 64 because of its flexibility, can be turned in a vertical plane as well as a horizontal plane. The tow pin, in all embodiments of the invention, is captured within a pocket formed between the links of the chain and tow pin slot, and hence, the tow pin cannot roll ahead of the pushing surface when, for example, it goes down a ramp. Also, each of the pushing surfaces illustrated extend transversely of the chain and are unobstructed at their outer edges by any of the other links of the chain. This enables the tow pin to be diverted and positioned in a shunt slot branching off from the main tow pin slot.

Hereinafter the following of the above-mentioned links may be referred to as "outer links": 20, 26, 52, 68, 192 and 200. Hereinafter the following of the above-mentioned links may be referred to as "inner links": 16, 24, 32, 58, 70, 194, 203 and 205. Hereinafter the following elements may be referred to as a blocking means: 196, 208, 210, 212 and 214.

The present invention may be embodied in other specific forms without departing from the spirit or essential attributes thereof and, accordingly, reference should be made to the appended claims, rather than to the foregoing specification as indicating the scope of the invention.

It is claimed:

1. A conveyor for moving a vehicle having a vertically disposed reciprocal tow pin, said conveyor comprising a chain adapted to be mounted for movement in at least one direction in a substantially horizontal plane, said chain including a series of opposed outer links each having their opposite ends connected to a single inner link, means connecting the ends of said links for relative movement of the links toward and away from adjacent links in the plane of said chain, at least two dog sections on said chain, each dog section being an integral link of said chain and having a pushing surface on one of its ends for engaging a tow pin and pushing it in the direction of movement of the chain, and blocking means on at least some of the outer chain links between adjacent dog sections to prevent entry of a tow pin therebetween and thereby preventing inadvertent pushing contact of the chain with a tow pin including a blocking surface adjacent the upper edge of the last-mentioned links and between a vertical plane containing the side faces of the last-mentioned links, said pushing surface lying in a plane at least as high as the plane of said blocking surface, the link next adjacent to the pushing surface being recessed to accommodate the end of a tow pin, said recess being between the pushing surface and the blocking surface, said connecting means including a connecting pin extending into a hole of greater transverse dimensions on the links so that adjacent links may have a limited amount of relative movement in a horizontal direction substantially perpendicular to the axis of the pin, whereby the chain can negotiate horizontal curves.

2. A conveyor in accordance with claim 1 wherein said chain is an endless chain, and the longitudinal axis of said pins being horizontal.

3. A conveyor in accordance with claim 1 wherein the outer links of said chain are the legs of inverted U-shaped links with the blocking surface being the bight portion thereof.

4. A conveyor in accordance with claim 1 wherein said blocking means includes a generally horizontally disposed flange at the upper end of an outer link, said flange extending toward the mating outer link on the opposite side of the chain.

5. A conveyor in accordance with claim 1 including a link having a dwell surface on its upper surface, said dwell surface being spaced from the pushing surface by said recessed link, and the link immediately preceding the dwell surface having a camming surface, whereby a tow pin may be cammed upwardly, stabilized, and then dropped into the recess for engagement with the pushing surface, and said chain being an endless chain.

6. A conveyor in accordance with claim 1 wherein said dog section link includes a plate secured to the upper surface thereof, said plate having a recess offset from the longitudinal center of the chain, said recess being a part of said pushing surface for receiving and pushing a vehicle tow pin.

7. A conveyor in accordance with claim 1 including a wear plate below said chain, the lower surface of said chain being in engagement with said wear plate, said wear plate being stationary with respect to said chain.

8. A conveyor in accordance with claim 1 including spaced rollers mounted beneath said wear plate and partially extending through an aperture in said wear plate for contact with a portion of the lower surface of the chain.

9. A conveyor for moving a vehicle having a vertically reciprocal tow pin, said conveyor comprising a chain adapted to be mounted for movement in at least one direction in a substantially horizontal plane, said chain including a series of oppositely disposed links, each having their ends connected to a single inner link, means connecting the ends of said links for relative movement toward and away from adjacent links in the horizontal plane of said chain, at least two dog sections on said chain, each dog section being an integral link of said chain and having a pushing surface on one of its ends for engaging a tow pin and pushing it in the direction of movement of the chain, and blocking means on at least some of said oppositely disposed links between adjacent dog sections to prevent entry of a tow pin therebetween and thereby preventing inadvertent pushing contact of the chain with a tow pin including a blocking surface adjacent the upper edge of the last-mentioned links and between a vertical plane containing the side faces of the last-mentioned links, said oppositely disposed links being non-planar with the transverse dimension of the chain at the central portion of the last-mentioned links being greater than at the location of said connecting means, the link next adjacent to the pushing surface being recessed to accommodate the end of a tow pin, said recess being between the pushing surface and the blocking surface, and said connecting means enabling said chain to negotiate vertical and horizontal curves.

10. A conveyor in accordance with claim 9 wherein said oppositely disposed links have curved end portions through which said connecting means extends so that the links on opposite sides of the chain may pivot toward and away from each other.

11. A conveying system for moving a vehicle having a vertically reciprocal tow pin, said conveying system comprising a vehicle supporting surface lying substantially in a horizontal plane, a pair of parallel channels below said supporting surface, a continuous elongated slot in said supporting surface for receiving the tow pin of a vehicle, said slot having an upstream portion above one of said channels and a downstream portion above the other of said channels, an endless chain supported within said channel beneath the upstream and downstream portions of said slot, said endless chain having a dog section for engaging and pushing a tow pin on a vehicle, means below said surface for driving said chain, said driving means including a pair of sprockets, each sprocket communicating with a channel and engaging said chain, one sprocket being upstream from and aligned with the downstream portion of said slot, and the other sprocket being downstream from and aligned with the upstream portion of said slot.

12. A conveying system in accordance with claim 11 including means for adjusting the spacing of one sprocket with respect to the other.

13. A conveying system for moving a vehicle having a vertically reciprocal tow pin, said conveying system comprising a vehicle supporting surface aligned substantially in a horizontal plane, a pair of parallel channels below said supporting surface, a continuous elongated slot in said supporting surface for receiving the tow pin of a vehicle, said slot having an upstream portion above one of said channels and a downstream portion above the other of said channels, an endless chain supported within said channels beneath the upstream and downstream portions of said slot, said chain having blocking surfaces at spaced points therealong for preventing inadvertent driving contact between the chain and a tow pin on the vehicle, said chain having pushing surfaces at spaced points therealong for pushing contact with a tow pin on a vehicle, means below said surface for driving said chain, said driving means including a pair of guide members in contact with the chain, one of said members being a driven sprocket, one of said members being positioned so as to receive the chain from the upstream portion on the slot, and the other member being positioned to discharge the chain into the downstream portion of said slot.

14. A system in accordance with claim 13 wherein said members are mounted for rotation about parallel axes, said axes being generally perpendicular to the upstream and downstream portions of the slot, and means for adjusting the relative spacing between said members.

15. A conveyor for moving a vehicle having a vertically reciprocable tow pin, said conveyor comprising a chain adapted to be mounted for movement in at least one direction in a substantially horizontal plane, said chain including a series of interconnected links connected together by horizontal pins so that the links may move toward and away from adjacent links in the plane of the chain, at least two dog sections on said chain, each dog section being an integral link of the chain recessed with a notch on its upper surface so as to provide a pushing surface for engaging a tow pin and pushing the tow pin in the direction of movement of the chain, other links of the chain adjacent the dog sections having a blocking surface adjacent the upper edge thereof so as to prevent entry of a tow pin into the space between opposite portions thereof at the side faces of the chain and thereby prevent inadvertent pushing contact of the chain with a tow pin, and at least some of said other links being inverted U-shaped links with the blocking surface thereon being the bight portion thereof, each bight portion being an elevation higher than said pushing surface.

16. In a conveyor in accordance with claim 15 including a track for said chain, a wear plate in the track below said chain and on which said chain is dragged, and said pushing surface being below the plane of the upper surface of said chain whereby overall height of the chain is minimized.

References Cited

UNITED STATES PATENTS

| | | | |
|---|---|---|---|
| 2,685,361 | 8/1954 | Garman et al. | 104—172 XR |
| 3,093,235 | 6/1963 | Imse | 198—129 |
| 3,244,114 | 4/1966 | Babson | 104—172 |
| 3,265,013 | 8/1966 | Czarnecki | 104—172 |

ARTHUR L. LA POINT, *Primary Examiner.*

D. E. HOFFMAN, *Assistant Examiner.*